US011986933B2

(12) United States Patent
Del Rossa

(10) Patent No.: US 11,986,933 B2
(45) Date of Patent: May 21, 2024

(54) FUEL INJECTOR REMOVAL ADAPTER

(71) Applicant: ProMax Limited Liability Company, Pittsburgh, PA (US)

(72) Inventor: Jeffrey Del Rossa, Pittsburgh, PA (US)

(73) Assignee: Milton Industries, Inc., Chicago, IL (US)

( * ) Notice: Subject to any disclaimer, the term of this patent is extended or adjusted under 35 U.S.C. 154(b) by 0 days.

(21) Appl. No.: 17/983,673

(22) Filed: Nov. 9, 2022

(65) Prior Publication Data

US 2023/0141758 A1 May 11, 2023

Related U.S. Application Data

(60) Provisional application No. 63/263,833, filed on Nov. 10, 2021.

(51) Int. Cl.

*B25B 27/00* (2006.01)
*B25B 27/02* (2006.01)
*F02M 99/00* (2006.01)

(52) U.S. Cl.

CPC ............. *B25B 27/02* (2013.01); *F02M 99/00* (2013.01); *B25B 27/0035* (2013.01)

(58) Field of Classification Search

CPC ....... B25B 27/00; B25B 27/02; B25B 27/023; B25B 27/026

See application file for complete search history.

(56) References Cited

U.S. PATENT DOCUMENTS 342,824 A * 6/1886 Clark ...................... B25B 13/08 81/124.2
5,048,378 A * 9/1991 Nikolas ................... B25B 13/50 81/176.15
6,898,999 B1 * 5/2005 Hsien .................... B25B 13/065 81/124.2
7,963,012 B1 * 6/2011 Brasher ................... B25B 27/00 29/244
8,256,081 B2 * 9/2012 Fridman ............... B25B 27/062 29/244
8,479,616 B2 * 7/2013 Tsai ........................ B25B 13/06 81/448
2006/0117916 A1 * 6/2006 Hsieh .................. B25B 23/0035 81/121.1
2009/0211408 A1 * 8/2009 Peng ..................... B25B 13/483 81/125
2023/0141758 A1 * 5/2023 Del Rossa .............. B25B 27/02 29/426.5

OTHER PUBLICATIONS

7PCS Oxygen Sensor Socket 22mm (7/8 in), 27mm, 29mm fits All Vehicle 02 Removal and Installation Universal Puller and Removal Tool . . . Feb. 2018.*

Dasbecan 8 Pcs Fuel Injectors Nozzle 12594512 Compatible with 2007 2008 2009 GMC Yukon Sierra 1500 Chevy Tahoe Avalanche Silverado 1500 5.3L 6.0L V8 Flex/Gas Replaces# 217-2436 . Sep. 2021.*

* cited by examiner

*Primary Examiner* — Lee D Wilson

(74) *Attorney, Agent, or Firm* — Buchanan Ingersoll & Rooney PC

(57) ABSTRACT

Embodiments relate to a removal adapter configured to engage a fuel injector secured to an engine and to allow for the removal of the fuel injector from the engine without damaging the fuel injector. The removal adapter is slid over the fuel injector and engages the fuel injector via a ridge. The engagement via the ridge places most, if not all, of the force on the strongest part of the fuel injector.

9 Claims, 6 Drawing Sheets

FUEL INJECTOR REMOVAL ADAPTER

CROSS-REFERENCE TO RELATED APPLICATIONS

This patent application is related to and claims the benefit of priority of U.S. provisional application 63/263,833, filed on Nov. 10, 2021, the entire contents of which is incorporated by reference.

FIELD OF THE INVENTION

Fuel injectors are subjected to engine temperatures that can become elevated due to various vehicle applications, such as towing, higher elevations, and higher ambient temperatures for example. Rubber/polymer "O" ring seals can become hardened relative to age and application duty cycles. Embodiments relate to a removal adapter configured to engage a fuel injector secured to an engine and to allow for the removal of the fuel injector from the engine without damaging the fuel injector.

BACKGROUND OF THE INVENTION

Fuel injectors are typically removed from engines using a sliding ring type collet. A ring collet consists of typically two small steel fingers that are placed at a spot around an object to be extracted. When the collet ring is pushed down the collet, or fingers, exerts a strong clamping force on the object. Due to the small cross section of the collet, the technique is inefficient, as fuel injectors are typically made of plastic, the strong clamping force, the wide extraction angle combined with the small contact point of the injector can damage the injector by cracking and breaking.

SUMMARY OF THE INVENTION

Embodiments relate to a fuel injector removal adapter configured to engage a fuel injector secured to an engine and to allow for removal of the fuel injector from the engine. The adapter engages the fuel injector laterally parallel to the injector via a ridge. When the adapter is pulled, force is transferred to the fuel injector and dislodges it from the engine. The configuration of the adapter eliminates lateral and angular force vectors that would otherwise be placed on the injector by other removal methods. Specifically, engagement via the ridge and over 270 degrees of contact places most, if not all, of the force on the strongest part of the fuel injector. The adapter's configuration and engagement prevent damage to the fuel injector during removal.

In an exemplary embodiment, a fuel injector removal adapter comprises a member. The member includes a first face, a fuel injector-receiving opening, and a pocket. The first face comprises a cut-away portion that extends through an edge of the first face. The fuel injector-receiving opening is positioned on a side of the member and is adjoined with a precision machined cut-away portion on the first face. The fuel injector-receiving opening has a width that it greater than the width of the cut-away portion, thereby forming a ridge. The ridge extends radially inward within the member. The pocket is positioned within the member and is adjoined with the fuel injector receiving opening and the cut-away portion.

In some embodiments, the cut-away portion and fuel injector-receiving opening form a defilade architecture.

In some embodiments, the member has a sidewall, an outer sidewall surface, and an inner sidewall surface, the inner sidewall surface is at least partially defined by the cut-away portion, and the defilade architecture provides 270 degrees of contact between the inner sidewall surface and an outer surface of a fuel injector when the fuel injector is received by the fuel injector removal adapter.

In some embodiments, the member is cylindrical.

In some embodiments, the member is rigid.

In some embodiments, the rigid member is machined turned aluminum.

In some embodiments, the member has a second face, and the second face comprises an aperture.

In some embodiments, the member has at least one indent located on the side and positioned on the opposite end in relation to the first face of the member. The indent extends along the longitudinal axis of the member.

In some embodiments, the cut-away portion on the first face complements a shape of a fuel injector for a precision fit.

In some embodiments, the fuel injector-receiving opening complements a shape of a fuel injector.

In some embodiments, the pocket complements a shape of a fuel injector.

In an exemplary embodiment, a method of using a fuel injector removal adapter involves inserting a fuel injector into the fuel injector removal adapter. The fuel injector removal adapter comprises a member. The member has a first face, a fuel injector-receiving opening, and a pocket. The first face comprises a cut-away portion that extends through an edge of the first face. The fuel injector-receiving opening is positioned on a side of the member and is adjoined with the cut-away portion on the first face. The fuel injector-receiving opening has a width that is greater than the width of the cut-away portion, thereby forming a ridge. The ridge extends radially inward within the member. The pocket is positioned within member and is adjoined with the fuel injector receiving opening and the cut-away portion. The method of inserting the fuel injector into the fuel removal adapter involves inserting the fuel injector into the fuel injector-receiving opening.

In some embodiments, the method involves engaging the fuel injector via the ridge and nearly 270 degrees of contact.

In some embodiments, the method involves engaging the fuel injector via the ridge, and pulling the fuel injector removal adapter to transfer force to the fuel injector.

In some embodiments, the member further comprises a second face comprising an aperture, and the method involves engaging the fuel injector via the ridge, and inserting a tool into the aperture.

In some embodiments, the member further comprises a second face comprising an aperture, and the method involves engaging the fuel injector via the ridge, inserting a tool into the aperture, and pulling the tool to transfer force to the fuel injector.

In some embodiments, the method involves forming a defilade architecture about the fuel injector when the fuel injector is inserted into the fuel injector-receiving opening.

In some embodiments, the member has a sidewall, an outer sidewall surface, and an inner sidewall surface, the inner sidewall surface is at least partially defined by the cut-away portion, and the defilade architecture provides 270 degrees of contact between the inner sidewall surface and an outer surface of the fuel injector when the fuel injector is received by the fuel injector removal adapter.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Figure 1:
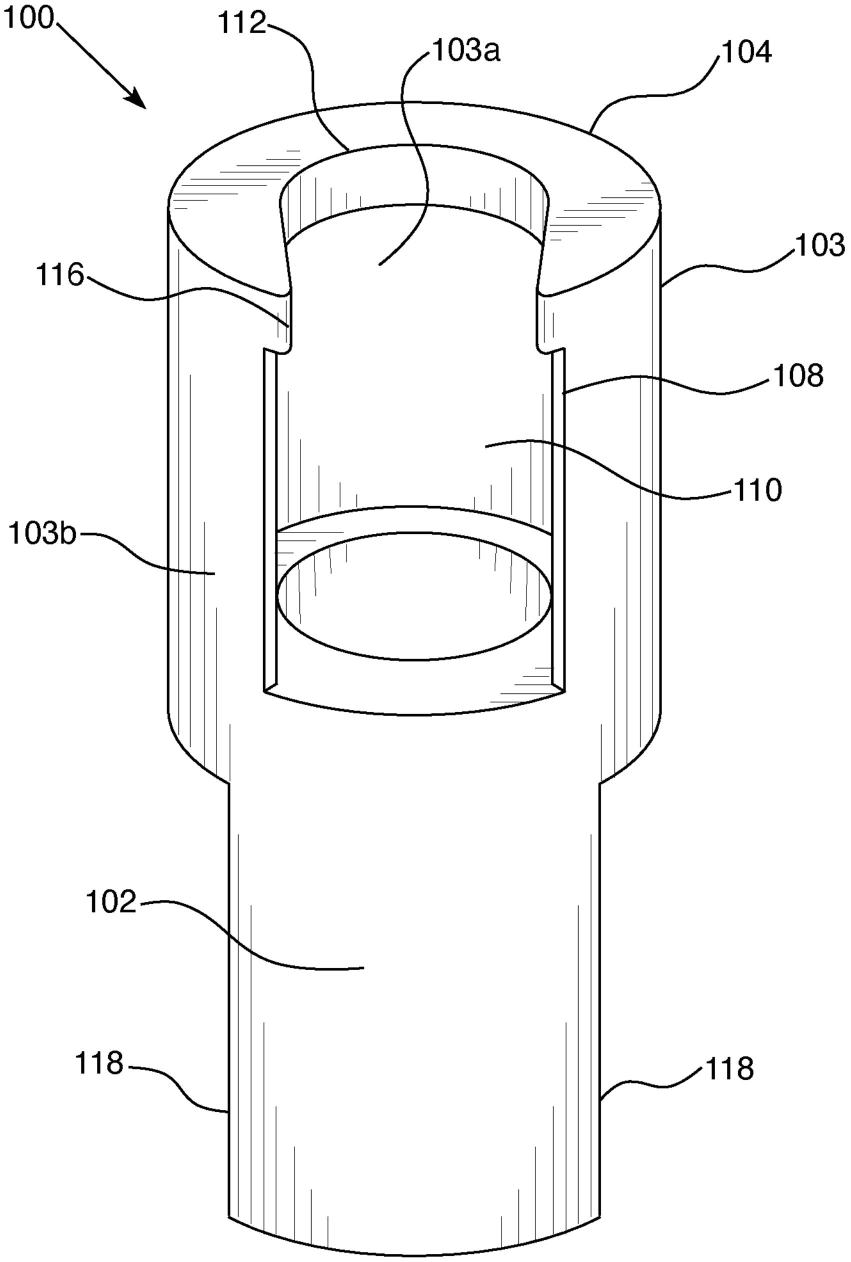
FIGS. 1-4 shows an embodiment of the fuel injector removal adapter.
Figure 2:
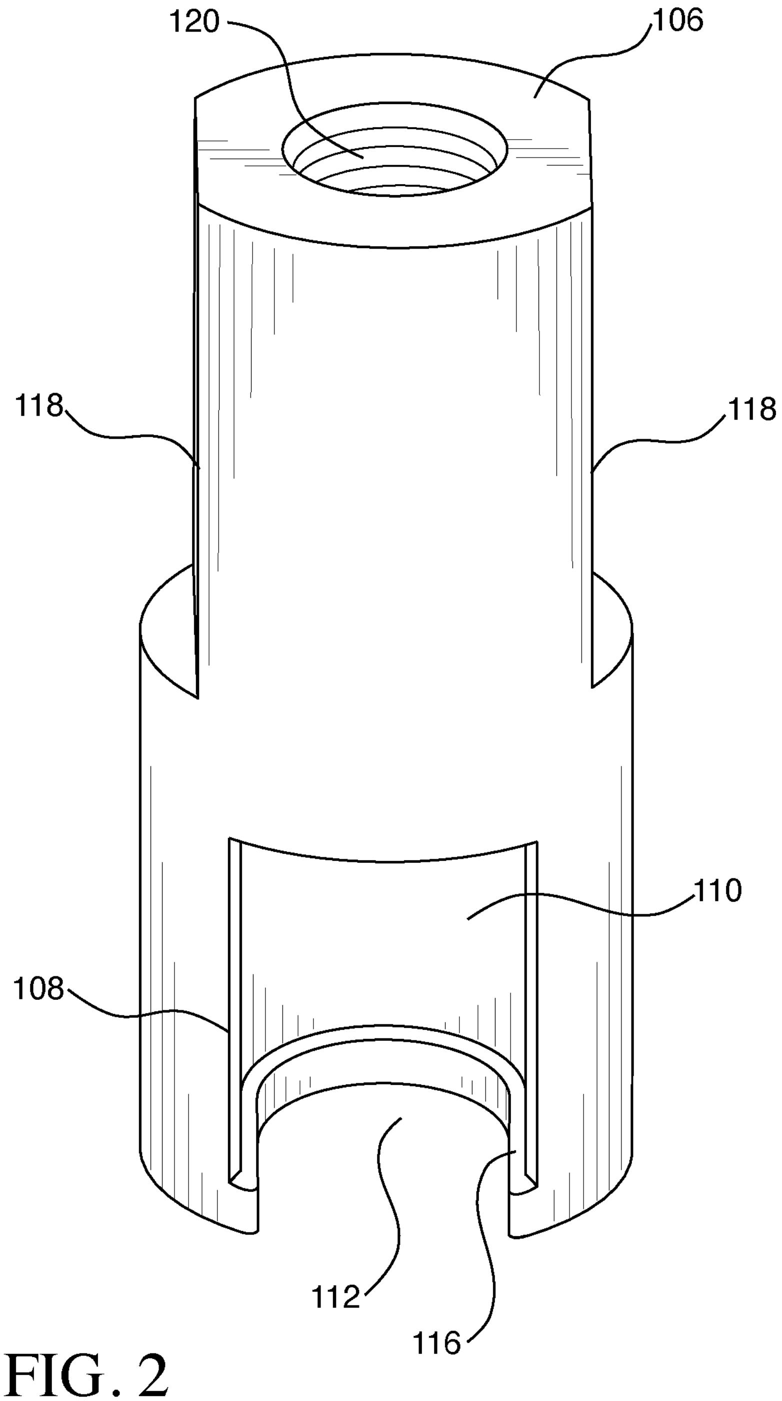
Figure 3:
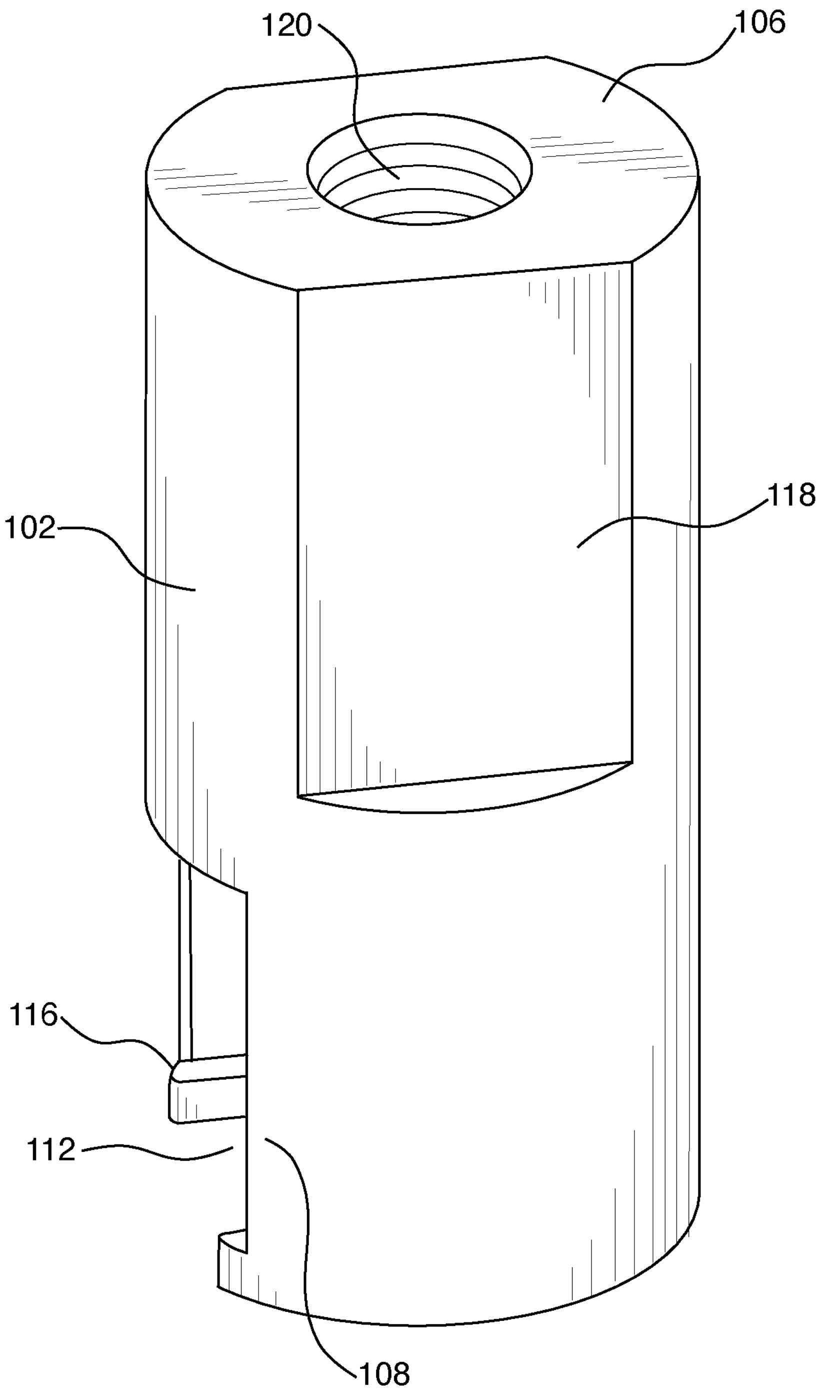
Figure 4:
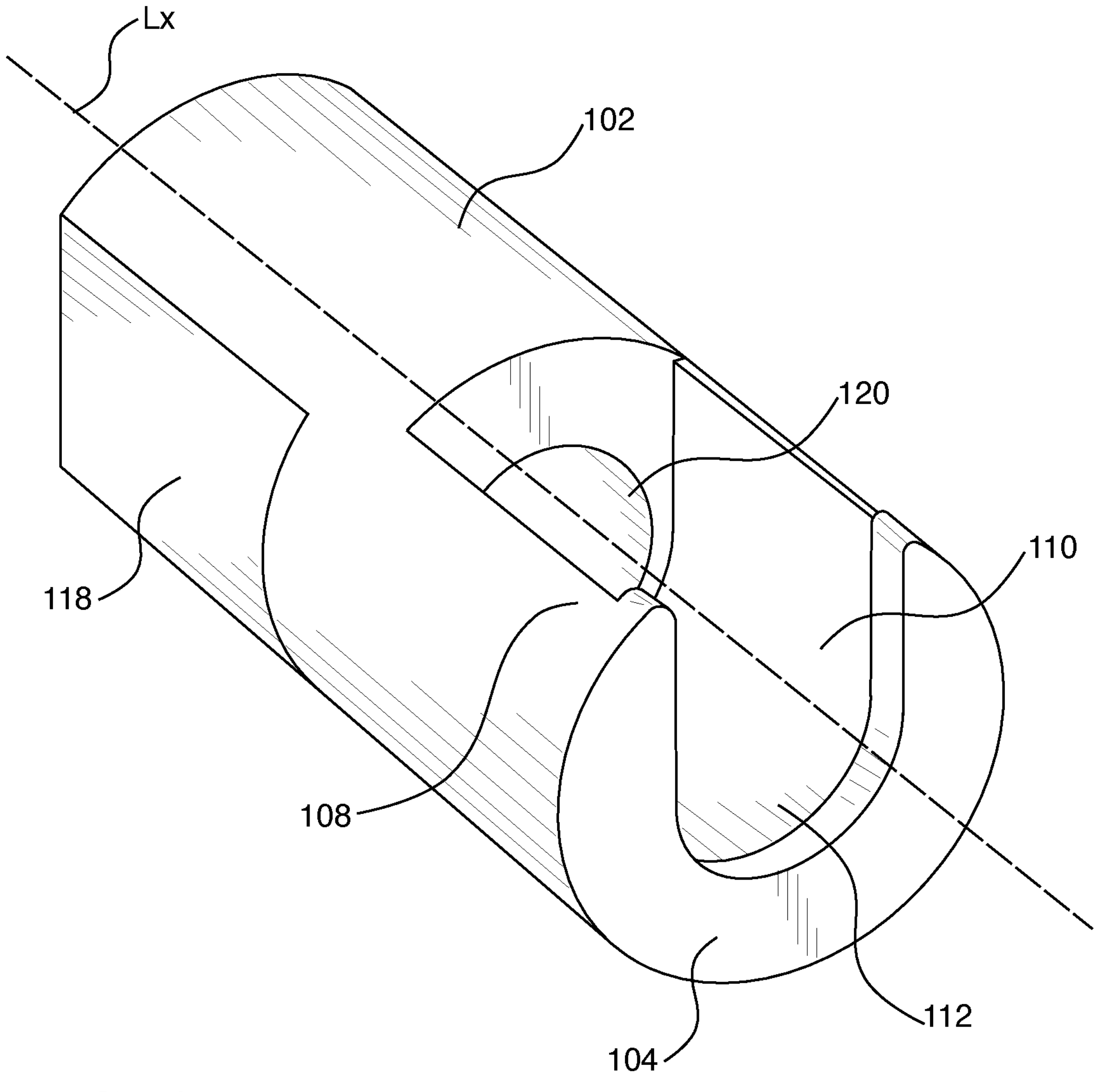

Embodiments relate to a fuel injector removal adapter 100 comprising a member 102 configured to receive a fuel injector 114. It is contemplated that the member 102 is a rigid material (e.g., metal, metal alloy, plastic, polymer, ceramic, composite material, etc.). In a preferred embodiment, the member 102 is aluminum or some like metal. In a more preferred embodiment, the member 102 is machined aluminum. In a most preferred embodiment, the member 102 is machine turned aluminum. The member 102 has a first face 104, a second face 106, and sidewalls 103. The member 102 has a longitudinal axis Lx (see FIG. 4) running from a first face 104 to a second face 106. It is contemplated for the member 102 to be cylindrical in shape with a circular cross-section when viewed along the longitudinal axis Lx. Other cross-sectional shapes can be used, such as triangular, square, hexagonal, etc. Each of the first face 104 and the second face 106 is shown to form a planar terminus, but any one or combination of the faces 104, 106 need not be planar in shape. The member also has a fuel injector-receiving opening 108 and a pocket 110.

At or near the first face 104 there is a cut-away portion 112. The cut-away portion 112 extends from some area on the first face 104 through an edge of the first face 104. The cut-away portion 112 may be any shape, such as circular, triangular, square, hexagonal, etc., but is contemplated to complement the shape of a fuel injector 114, which typically consists of a generally cylindrical or prismatic stem-like member topped with a spherical, hemispherical, or prismatic knob-like member. The cut-away portion 112 can be generated via machining techniques to form a precision machined cut-away formation.

The fuel-injector receiving opening 108 is positioned on a side (e.g., within a sidewall 103) of the member 102 and is adjoined with the cut-away portion 112 on the first face 104. The fuel-injector receiving opening 108 may be any shape, such as circular, triangular, square, hexagonal, etc., but is contemplated to complement the shape of a fuel injector 114, which typically consists of a generally cylindrical or prismatic stem-like member topped with a spherical, hemispherical, or prismatic knob-like member. The width of the fuel-injector receiving opening 108 is configured to be greater than the width of the cut-away portion 112 in order to form a ridge 116. The ridge 116 extends radially inward, which means the ridge 116 extends from the perimeter of the first face 104 inward towards the center point of the cross-sectional shape of the member 102.

The pocket 110 is positioned within the member 102 and is adjoined with the fuel injector-receiving opening 108 and the cut-away portion 112. The pocket 110 may be any shape, such as circular, triangular, square, hexagonal, etc., but is contemplated to complement the shape of a fuel injector 114, which typically consists of a generally cylindrical or prismatic stem-like member topped with a spherical, hemispherical, or prismatic knob-like member. The pocket 110, the fuel injector-receiving opening 108, and the cut-away portion 112 can work in conjunction to house a fuel injector 114 when the fuel injector 114 is inserted into the fuel injector removal adapter 100. Once inserted, the fuel injector 114 can be engaged by the ridge 116 to prevent the fuel injector 114 from escaping the fuel injector removal adapter 100. Once the fuel injector 114 is inserted into the fuel injector removal adapter 100, the fuel injector removal adapter 100 can be pulled (e.g., pulled in a direction that is defined by a vector leading from the front face 104 to the second face 106) to transfer force to the fuel injector 114. The engagement via the ridge 116 places most, if not all, of the pull force on the strongest part of the fuel injector 114. This configuration and engagement prevents damage to the fuel injector 114 during removal.

Figure 5:
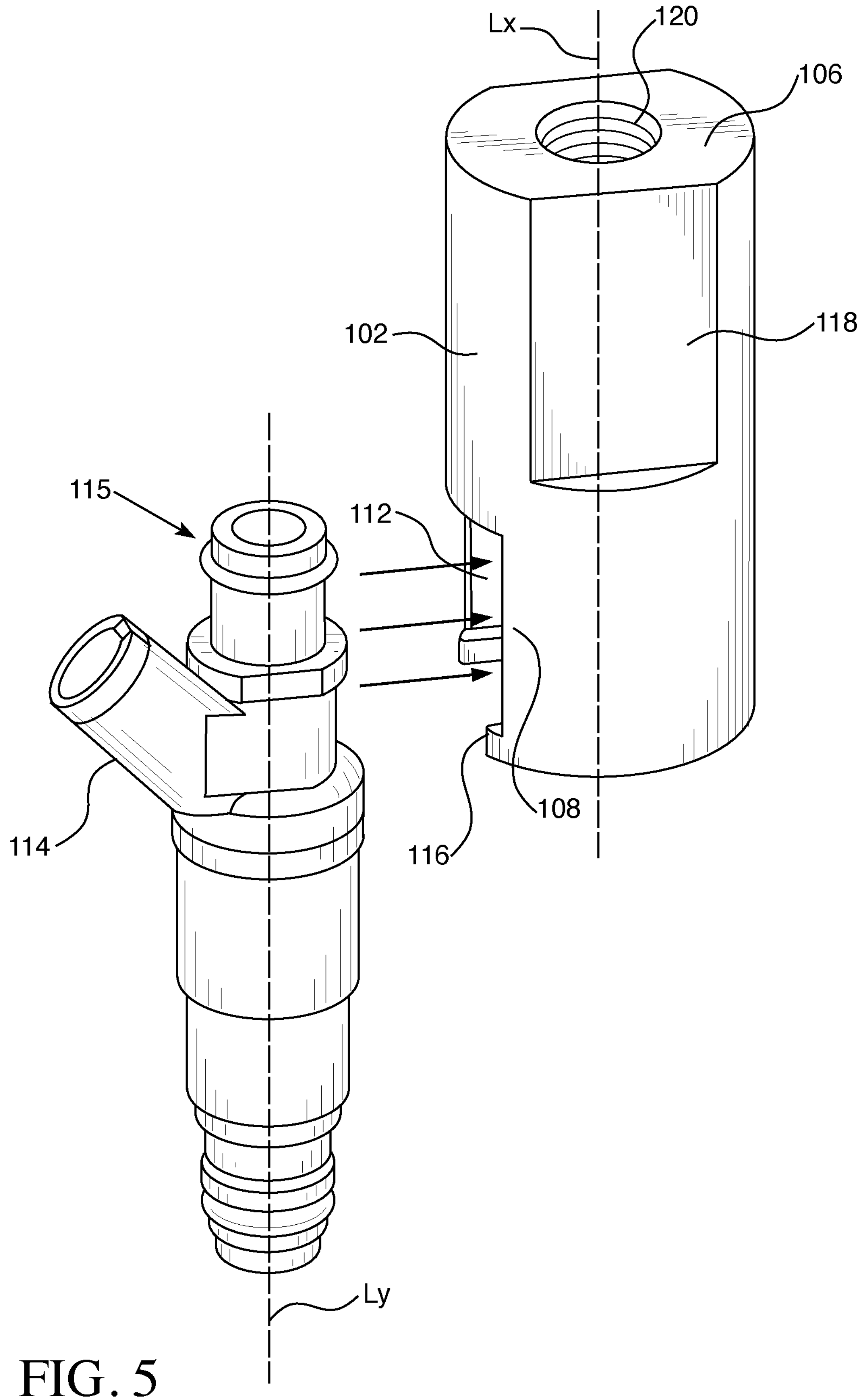
FIG. 5 shows an embodiment of the fuel injector removal adapter with a fuel injector inserted into the fuel injector removal adapter.
Figure 6:
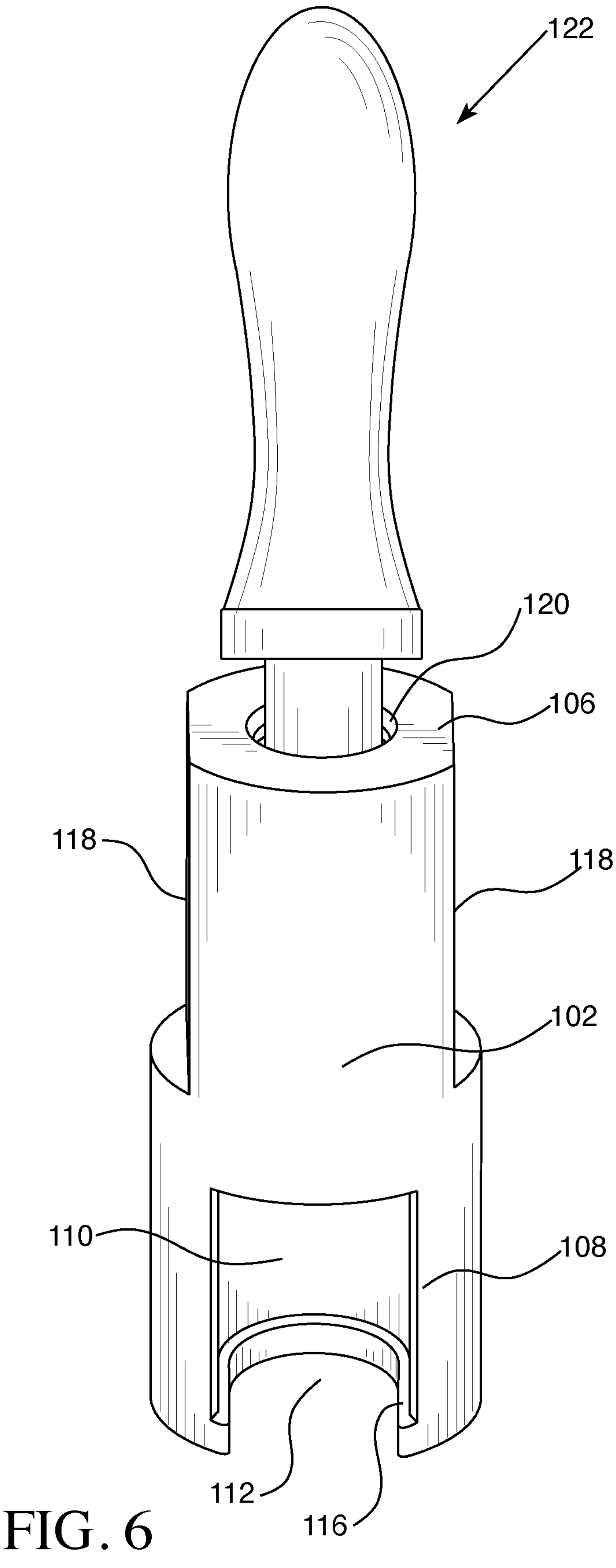
FIG. 6 shows an embodiment of the fuel injector with a tool inserted into the threaded aperture of the fuel injector removal adapter.

As can be appreciated from the above disclosure, a preferred embodiment of the fuel injector removal adapter 100 comprises a member 102 with a first face 104, a second face 106, and sidewalls 103. At or near the first face 104 is a cut-away portion 112 that is machined into the sidewall 103. The cut-away portion 112 forms a bored out region within the member 102. This cut-away portion 112 not only complements a shape of a fuel injector 114, but the cut-away portion 112 is generated so that it forms a fuel-injector receiving opening 108 within the sidewall 103. Thus, member 102 includes sidewalls 103 having an inner sidewall surface **103*a* and an outer sidewall surface 103*b*. The cut-away portion 112 is defined by the inner sidewall surface 103*b*, the ridge 116, and the pocket 110. The fuel-injector receiving opening 108 is an opening that complements a side profile of a fuel injector 114, or is an opening that is at least as wide as the fuel injector 114 so as to allow the fuel injector removal adapter 100 to receive the fuel injector 114 via lateral sliding motion—see FIG. 5. The cut-away portion 112 of the inner sidewall surface 103*b*, the ridge 116, and the pocket 110 are precision cut to generate a precision fit with the fuel injector 114. The fuel injector 114 has a formation 115 (e.g., rim, lip, collar, etc.) that fits into the cut-away portion 112 via the fuel-injector receiving opening 108 and mechanically engages (e.g., abuts against) with the ridge 116 when the fuel injector removal adapter 100 is pulled from the front face 104 to the second face 106—i.e., the inner sidewall surface 103*b* has an inner diameter that is equal to or greater than the outer diameter of this formation 115, but the ridge 116 has an inner diameter that is less than the outer diameter of this formation 115. While the fuel-injector receiving opening 108 is wider than that of the fuel injector 114 to allow for lateral sliding motion of the fuel injector 114 therein and therefrom, it is only slightly wider. This configuration allows for the inner sidewall surface 103*b* to mechanically engage with or abut against an outer surface of the fuel injector 114. With this configuration, the fuel injector removal adapter 100 forms an defilade about the fuel injector 114—e.g., the inner sidewall surface 103*b* surrounds and abuts against the fuel injector 114 outer surface about the circumference of the fuel injector 114 except at the fuel-injector receiving opening 108. With the fuel injector receiving opening 108 being only slightly wider than the fuel injector 114, the inner sidewall surface 103*b* can generate up to 270 degrees of contact with the fuel injector 114 outer surface (or at least the fuel injector 14 outer surface portion that is within the adapter 100) when the fuel injector 114 is received by the adapter 100. This defilade architecture provides structural support to the fuel injector 114 and helps keep the fuel injector 114 in a straight position when forces are applied to remove the fuel injector 114. The ridge 116 and pocket 110 provide additional structural support and further assist with proper alignment of the fuel injector 114. When the fuel injector 114 is received by the fuel injector removal adapter 100 and the adapter 100 is pulled from the front face 104 to the second face 106, the ridge 116 mechanically engages with or abuts with the formation 115 of the fuel injector 114. Force vectors are then transferred to the fuel injector 114 at this formation 115. This ridge 116 extends about the circumference of the inner sidewall surface 103*b*, and thus the force(s) applied to the fuel injector 114 is/are spread about this entire ridge 116. This prevents or reduces high pressure points being applied to the fuel injector 114—high pressure points that tend to lead to damage of the fuel injector 114. The ridge 116 is parallel or substantially parallel with the formation 15 when the fuel injector 114 is properly aligned due to the defilade architecture, and thus the force vectors transferred to the fuel injector 114 via the ridge 116 are parallel or substantially parallel to longitudinal axis Lx. The defilade architecture forces the fuel injector 114 to be in proper alignment so that its longitudinal axis Ly is coaxial with that of Lx. Thus, the force vectors imposed on the fuel injector 114 are parallel or substantially parallel to Ly. The formation 15 of the fuel injector 114 is structurally able to accommodate these force vectors without damage to the fuel injector 114. Notably, there are little to no lateral (directions that are non-parallel to Ly) force vectors imposed on the fuel injector 114. Furthermore, there are no high pressure forces imposed on the fuel injector 114, as the force(s) imposed on the fuel injector 114 is/are spread about the formation 15/ridge 116** contact area.

The member 102 can have at least one indent 118 formed in a sidewall 103. It is contemplated that the member 102 has a plurality of indents 118. The indents 118 can be positioned opposite of the first face 104 and can extend with the longitudinal axis of the member 102, which means that the indents 118 run parallel with the longitudinal axis Lx of the member 102. The indents 118 can improve the fuel injector removal adapter's 100 efficiency in removing the fuel injector 114. For instance, the indents 118 may provide for an ergonomic design that allows a user to grip the member 102 easily with fingers and/or hands.

The second face 106 can have an aperture 106. It is contemplated that the second face 106 has a threaded aperture 120. The threaded aperture 120 can receive a tool 122, such as a drive tool or rotary tool, which may assist the fuel injector removal adapter's 100% efficiency in removing the fuel injector 114. For instance, a tool 122 can be inserted into the threaded aperture 120 that allows a user to more easily pull the member 102 and transfer force to the fuel injector 114. The threading of the aperture is used to provide an engagement or securement between the tool 122 and the adapter 100. Other mechanical engaging aperture configurations can be used, such as pin-detent, interference fit, magnetic connection, etc.

It should be understood that modifications to the embodiments disclosed herein can be made to meet a particular set of design criteria. For instance, the number of or configuration of components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the device and methods of making and using the same have been discussed and illustrated herein, it is to be distinctly understood that the invention is not limited thereto but may be otherwise variously embodied and practiced within the scope of the following claims.

What is claimed is:

1. A system, comprising:

a fuel injector, and a fuel injector removal adapter comprising:

- a first face comprising a planar cut-away portion extending through an edge of the first face;
- a longitudinal fuel injector-receiving opening positioned on a side of the fuel injector removal adapter and adjoined with the cut-away portion, wherein the fuel injector-receiving opening has a width that is greater than the width of the cut-away portion to form a ridge, the ridge extending radially inward; and
- a pocket positioned within the fuel injector removal adapter and adjoined with the fuel injector-receiving opening and the cut-away portion, wherein the fuel injector removal adapter is configured to receive the fuel injector.

2. The system of claim 1, wherein the fuel injector removal adapter has a sidewall, an outer sidewall surface, and an inner sidewall surface, the inner sidewall surface is at least partially defined by the cut-away portion, and wherein the cut-away portion and fuel injector-receiving opening form a defilade architecture about the fuel injector such that the inner sidewall surface surrounds and abuts against an outer surface of the fuel injector except at the fuel injector-receiving opening when the fuel injector is received by the fuel injector removal adapter.

3. The system of claim 2, wherein:

the defilade architecture provides 270 degrees of contact between the inner sidewall surface and the outer surface of the fuel injector when the fuel injector is received by the fuel injector removal adapter.

4. The system of claim 1, wherein the fuel injector removal adapter is cylindrical.

5. The system of claim 1, wherein the fuel injector removal adapter is rigid.

6. The system of claim 5, wherein the fuel injector removal adapter is machined turned aluminum.

7. The system of claim 1, wherein the fuel injector removal adapter has a second face comprising an aperture.

8. The system of claim 1, wherein the fuel injector removal adapter has at least one indent located on the side and positioned opposite the first face and extending with the longitudinal axis of the fuel injector removal adapter.

9. The system of claim 1, wherein the cut-away portion complements a shape of the fuel injector.

* * * * *